United States Patent Office

2,836,579
Patented May 27, 1958

1

2,836,579
POLYCARBONAMIDE FROM HEXAMETHYLENE DIAMINE AND 2,2-BIS-(CARBOXYPHENYL) PROPANE

Carl E. Schweitzer, Wilmington, Del., assignor to E. I. du Pont de Nemours and Company, Wilmington, Del., a corporation of Delaware No Drawing. Application August 10, 1953
Serial No. 373,432

11 Claims. (Cl. 260—78)

This invention relates to new high-softening amorphous polyamides having, over a wide range of temperature, a unique combination of such mechanical properties as high tensile, impact, and flexural strengths, high fatigue endurance limit, very low creep, negligible vibrational energy absorption, and retention of stiffness at elevated temperatures.

The polymers to which the present invention is directed are, specifically, hexamethylenediamine polyamides of 2,2 - bis(carboxyphenyl)propanes. These polymers are characterized by their amorphous character and resistance to crystallization or orientation. Some of the properties of these polymers may result from restricted rotation within the acid molecule and from the fact that the shape of the molecule in space evidently is such as to prevent easy packing and to discourage crystallinity. This restriction of rotation appears to be caused by the presence of methyl groups on the bridging carbon atom linking the carboxyphenyl groups. Whether or not this theoretical explanation correctly accounts for the marked difference in properties between said polyamides and those from diacids having free rotation, is of no consequence so far as the definition of the present invention is concerned, since the invention is based upon the practical application of the discovery that such a marked difference in properties actually does occur. The polymers of this invention are characterized by being made up of chains of recurring hexamethylene diamine and 2,2-carboxyphenyl propane units, as illustrated in the following formulation:

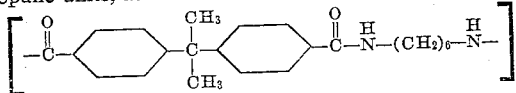

The polymers having the aforesaid structure are generally derived from hexamethylenediamine and 2,2-bis-(carboxyphenyl)-propanes, by polymerization methods hereinafter disclosed.

These polymers are particularly characterized in that they generally do not become molecularly oriented, as determined by X-ray diffraction measurements, when fibers thereof are stretched even to the extent of 100%; moreover, they fail to crystallize upon being heated in air for 300 hours at 150° C.

The 2,2-bis-(carboxyphenyl)propanes employed in the preparation of the said polymers can be prepared by the methods disclosed in the Schweitzer application, S. N. 354,381, filed May 11, 1953, Patent No. 2,794,822. As starting materials in preparing these acids, 2,2-ditolyl-propanes may be used (cf. U. S. 2,455,643, for a method of making 2,2-di-p-tolylpropane).

The 2,2-ditolylpropane employed in certain embodiments of this invention can be made by reaction between toluene and 2,2-dichloropropane. The latter compound can be produced by reaction of acetone with phosphorus pentachloride. In one procedure, 2,2-dichloropropane is reacted with toluene in the presence of anhydrous aluminum chloride to give a 74% conversion to ditolylpropane with a yield of 80% based on 2,2-dichloropropane.

The desired 2,2-bis(carboxyphenyl)propanes can be obtained from the 2,2-ditolylpropanes by oxidation. In a preferred procedure the 2,2-ditolylpropanes were oxidized with nitric acid, by the method herein described in greater detail, and a mixture of isomeric 2,2-bis(carboxyphenyl)propanes was obtained. When this mixture of acids was fractionally crystallized, fractions with the same neutral equivalent but widely different melting points were obtained. Infra red analysis of the highest melting acid obtained in this fashion (melting point approximately 300° C.) showed that it was almost pure 2,2 - bis - (m-carboxyphenyl)propane. The quantity of this m,m-isomer constituted about 20% of the total acid product.

Moreover, pure 2,2 - bis - (p-carboxyphenyl)propane can also be synthesized by: (1) condensing acetone and aniline in the presence of hydrochloric acid to give 2,2-bis-(p-aminophenyl)-propane (13% yield), (2) replacing the amino groups by nitrile groups (48% yield by the Sandmeyer reaction), and (3) hydrolyzing the nitrile with aqueous acid (93% yield of the di-acid in the nitrile hydrolysis step).

The details of the preparation are given below.

PREPARATION OF 2,2-BIS-(CARBOXYPHENYL)-PROPANES

A. *Oxidation of 2,2-ditolylpropane*

A mixture consisting of 15 grams aqueous 70% nitric acid, 0.1 gram $NH_4VO_3$, 15 grams water, and 4.5 grams ditolylpropane (prepared as above-described) was heated at 100° C. for 40 hours in a flask equipped with a reflux condenser. The resulting mixture was cooled and filtered after which the solid filter-cake was broken up and washed well with water. It was then dissolved in a 25% excess of aqueous 20% sodium hydroxide solution. The solution thus obtained was extracted with 50 cc. diethyl ether which removed a few tenths of a gram of sweet-smelling sticky yellow oil which could be isolated by evaporation of the ether from the extract. The aqueous phase was again filtered and acidified with aqueous 15% HCl with vigorous stirring. This caused the precipitation of a gummy mass. Upon washing this with water and drying it in air, a dry acid was obtained. Attempts to fractionally crystallize this acid from glacial acetic acid gave crystalline products having a wide range of melting points but the same neutral equivalent, namely, 140–143. Four batches of crystals were obtained by successively removing acetic acid from a heated solution of the solid mass, followed by cooling the resulting solution. The first batch had a melting point of 278° to 284° C. and the last batch to crystallize had a melting point of 297° to 299° C. The latter material by infra red analysis (comparison of infra red spectrum with the spectrum of known metacarboxy compounds) was shown to be 2,2-bis-(m-carboxyphenyl)propane.

It will be apparent from the disclosures contained hereinafter that the p,p′-isomer is actually higher melting than the m,m′-isomer prepared as above described, the reason for the higher melting point of the m,m′-fraction here being the absence therein of substantial amounts of other isomers in the purified m,m′-product.

B. *Synthesis of 2,2-bis-(p-carboxyphenyl)propane from 2,2-bis-(p-aminophenyl)propane*

A mixture consisting of 185 grams of aniline and 675 grams of water was mixed with a sufficient quantity of concentrated hydrochloric acid to cause the aniline to dissolve. The resulting solution was cooled and introduced into a shaker tube with 40 grams of acetone. The tube contents were heated at 145° under autogenous pressure for 6 hours after which the mixture was cooled and made alkaline by the addition of a solution of 150 grams of sodium hydroxide in 500 cc. of water. This alkaline mixture was extracted with five 200 cc. portions of ether. The ether extracts were combined and washed with three 500 cc. portions of aqueous saturated sodium sulfate solutions. After this the ether solution was dried over NaOH and filtered. The ether was evaporated on a steam bath and the residue was mixed with 160 grams K$_2$CO$_3$ and distilled under diminished pressure. The fraction boiling at 200° to 231° at a pressure of 5.5 mm., was recrystallized from benzene to give 20.2 grams of a yellow solid having a melting point of 128.2 to 129.6° C. This was pure 2,2-bis-(p-aminophenyl)propane. 18 grams of this material was stirred into 50 cc. of aqueous 35% HCl. Ice (150 grams) was added to the reaction mixture and the temperature was kept to −5 to 0° C. by adding ice and by keeping the mixture surrounded by an ice bath. While maintaining the mixture at this temperature a solution of 16 grams sodium nitrite in 40 cc. water was added with stirring over a period of 10 minutes. Stirring was continued for an additional 15 minutes after which 10 grams sodium carbonate was slowly added, which made the solution neutral to litmus. A cuprous cyanide solution was prepared by adding 32.5 sodium cyanide in 50 cc. of water to a stirred mixture of 22.5 grams cuprous cyanide and 100 cc. water surrounded by an ice bath. 50 cc. benzene was added to this cuprous cyanide solution and it was stirred and kept at 0° by the addition of ice while the neutral solution just described was added gradually over a period of 30 minutes. The resulting mixture was stirred for one hour at 0° and then allowed to warm to room temperature over a period of another hour. After this, it was stirred at 25° for 90 minutes and at 50° for 5 minutes. The resulting mixture was extracted with two 200 cc. portions of benzene and the combined benzene washes were washed successively with 200 cc. saturated aqueous sodium sulfate solution, 200 cc. aqueous 10% NaOH solution, 200 cc. saturated sodium sulfate, 200 cc. 20% H$_2$SO$_4$, and four 200 cc. portions of aqueous saturated sodium sulfate. The remaining solution was filtered and the bezene was evaporated while keeping the temperature below 100° C. The residue was distilled and 10 grams of a fraction having a boiling range of 220° to 230° C. at a pressure of 3.8 mm. was obtained. Crystallization of this fraction from methanol gave 9.7 grams pale yellow crystals having a melting point of 138.5° to 140° C. Further recrystallization gave 9.3 grams cream colored crystals having a melting point of 139.2 to 140.5° C. This material was found to contain 11.3% nitrogen (calculated for 2,2-bis-(p-cyanophenyl)propane, 11.39%).

A mixture of 9.0 g. of this 2,2-bis-(p-cyanophenyl)propane and 200 cc. aqueous 75% H$_2$SO$_4$ was heated with stirring at 140° to 150° C. for three hours. The temperature was then raised to 190° C., and heating was continued at that temperature for 1.5 hours. After this, the mixture was cooled and added to 400 cc. of ice water. The resulting precipitate was removed by filtration and washed well with water. It was dissolved in a solution of 10 grams NaOH in 200 cc. water and the solution was filtered and heated to boiling. To the boiling solution 50 cc. aqueous 35% HCl admixed with 50 cc. water was added slowly and a precipitate was obtained. This precipitate was digested for 30 minutes at 100°. The mixture was then cooled and filtered and the filter cake was washed well with water and finally air dried. The dry acid was recrystallized and decolorized (by means of charcoal) from glacial acetic acid twice. The yield of 9.5 grams white crystals (melting point 314° C., neutralization equivalent=142.5). This pure 2,2-bis-(p-carboxyphenyl)propane sublimed sharply at 310° under a pressure of 2 mm. to give well formed crystals.

C. *Synthesis of 2,2-bis-(p-carboxyphenyl)propane from 2,2-diphenylpropane*

A mixture of 2200 ml. of benzene and 81.0 g. of aluminum chloride was cooled to 5° C. and 250 g. of dichloropropane added dropwise over 1 and ½ hours at a rate such that the temperature did not rise above 5° C. An additional 28 g. of aluminum chloride was added all at once and the mixture stirred at 10–20° C. for an additional 1 and ½ hours. The reaction mixture was decomposed by pouring slowly with stirring into one liter of ice water. After separating, the organic layer was washed with 1 liter of 25% aqueous potassium carbonate solution for 30 minutes. The organic layer was separated, dried over anhydrous sodium sulfate, and benzene removed by distillation at atmospheric pressure until the temperature reached 130° C. The residual yellow liquid was distilled under reduced pressure over 5 g. of potassium hydroxide to give 201.3 boiling at 90–95° C./1 mm., $n_D^{25}$ 1.5692 for a yield of 47% based on 2,2-diphenylpropane from dichloropropane. One liter of acetyl chloride was cooled to −50° C. and 608 g. of aluminum chloride added over 30 minutes during which time the temperature rose to −30° C. The 2,2-diphenylpropane (200 g.) was added in a thin stream over a 15 minute interval during which time the temperaure rose to −25° C. While the reaction mixture was stirred the temperature was permitted to rise to 0° C. over 1 hour, then the mixture was decomposed by pouring onto 5 kg. of stirred, crushed ice. The granular solids were then stirred for 1 hour longer, collected by filtration, washed with 2 liters of water in the Waring Blendor and sucked dry on the filter. After drying overnight under vacuum, there was obtained 343.9 g. of crude material. This was dissolved in 4 liters of methylcyclohexane, treated with activated carbon and filtered hot through absorbent clay. The diketone, 2,2-bis-(p-acetylphenyl)propane, crystallized upon cooling as thin, irregular plates. There was obtained in this manner 120.1 g., M. P. 65–67° C. and 30.1 g., M. P. 66–68° C. for a total of 150.2 g. for a yield of 58% based on diphenylpropane. Further condensation of the filtrates gave only a mobile tan oil. The 2,2-bis-(p-acetylphenyl)propane was oxidized by adding a solution of 150 g. of the compound in 490 ml. of dioxane to a stirred solution of sodium hypochlorite prepared by bubbling 265 g. of chlorine into a solution of 450 g. of sodium hydroxide in 2.1 liters of distilled water. The oxidation was moderated with an ice bath so as to keep the temperature between 35 and 40° C. After 30 minutes, the cooling bath was removed and the milky suspension stirred for 12 hours at room temperature. The reaction mixture was extracted with two 500 ml. portions of carbon tetrachloride, whereupon the sodium salt of 2,2-bis-(p-carboxyphenyl)propane precipitated in the aqueous layer. This was collected by filtration, dissolved in 4 liters of water and treated with activated carbon. After removing the carbon by filtration, the hot solution was saturated with sodium chloride and allowed to cool overnight. The sodium salt of 2,2-bis-(p-carboxyphenyl)propane crystallized as long fine needles. This was collected by filtration, dissolved in 4 liters of hot water at 70° C. and acidified by adding slowly with rapid stirring 500 ml. of 1:1 aqueous solution of hydrochloric acid. After cooling in an ice bath to 10° C., the precipitated acid was collected by filtration, washed with ice cold water until free of chloride ion and dried at 145° in vacuum for 12 hours. In this manner, there was obtained 135.0 g. of crude acid. Acidification of the combined alkaline filtrates gave an addition 14.9 g. for a total of 149.9 g. corresponding to a 2,2-bis-(p-carboxyphenyl)propane yield of 91% based on 2,2-bis-(p-acetylphenyl)propane. The crude acid was dissolved in 6 liters of hot ethanol. After treating with activated carbon, the solution was filtered and two liters of alcohol removed by distillation. Hot water was added until the solution became faintly turbid. Upon cooling, the acid separated as long, fine needles. In this manner there was obtained three crops for a total of 135.7 g., M. P. 315–316° (90% recovery).

The preparation of the polyamide from the diamine and diacid can be carried out by mixing these ingredients together in equivalent quantities and heating the resulting mixture at temperatures sufficiently high to complete the polymerization yet not so high as to cause degradation.

Suitable maximum temperatures for this purpose are in the range of about 200° to 300° C. The polymerization can be conducted in various stages, and if desired a prepolymer of relatively low molecular weight can be produced at relatively low temperature, e. g. as low as 120° C. especially when a diester is employed in place of diacid, and converted by further heating to a polymer of higher molecular weight. The polymerization can be assisted by the use of a final vacuum heating, but this is neither essential nor in all instances desirable. The polymerization should preferably be continued until the inherent viscosity, as measured in a 0.5% solution in m-cresol, reaches the desired level, e. g. 0.4 to 2.0. As is true of other polyamides, the physical properties improve with molecular weight up to a certain level, generally corresponding to an inherent viscosity in the range of about 0.5 to 0.9, whereupon the improvement tapers off, and there is no substantial further advantage to be gained by carrying out the polymerization to a still higher molecular weight (and inherent viscosity). In fact, since the workability of the polymer decreases with further increase in inherent viscosity, it is generally desirable to limit the molecular weight to a range corresponding to a maximum inherent viscosity of about 1.7.

To facilitate limiting the molecular weight of the polyamide to the range hereinabove specified, it is frequently preferable, although not at all necessary, to add a "chain length regulator," such as a monocarboxylic acid, in relatively small quantity (e. g. from 0.5 to 4 mol percent based on the dibasic acid content) to produce a polyamide in the desired range of inherent viscosity. Any suitable monocarboxylic acid may be employed for this purpose. It is convenient but not essential, to employ a monocarboxylic acid which is normally of low volatility at the temperature employed. However, alkanoic acids generally, and particularly acetic acid and other lower alkanoic acids may also be employed for this purpose, almost or quite as satisfactorily as less volatile carboxylic acids, such as benzoic, naphthenic, naphthoic, etc., especially if a closed vessel is employed during the time when free acid is present at elevated temperature. Other chain length regulators, i. e. end-cappers, such as carboxylic acid anhydrides (succinic, phthalic, acetic), primary or secondary amines, or a controlled slight excess of one of the polyamide components, may be employed for the same purpose.

A polymerization catalyst such as phosphoric acid may also be added to speed up the polymerization, and this is sometimes desirable since the 2,2-bis(carboxyphenyl)-propanes are not sufficiently strong acids to effect the polymerization at the maximum rate which may be desired.

A further refinement which can be resorted to in order to achieve the closest possible approximation to equivalency between the quantity of diamine and diacid present is to determine by analysis the number of amine and acid end groups, and to obtain a closer approach to a balance between these two by adding the required amount of diamine to the mixture, towards the end of the polymerization reaction, thus compensating for any traces of diamine lost through evaporation.

It is to be understood that in place of 2,2-bis-(carboxyphenyl)propane the corresponding amide-forming derivatives such as the ester (methyl ester, phenyl ester, etc., both di- and mono-), the acid chloride (mono- and di-), or the acid anhydride may be used. It is frequently preferable, however, to employ the parent acid itself since the product formed in that instance, other than the polymer itself, is water. It is generally desirable to remove such water (or other corresponding by-product) at as low a temperature as possible in order to avoid the necessity for employing polymerization conditions which are unduly drastic.

Stabilizers and/or antioxidants may, of course, be added to the polymeric product if desired. Suitable stabilizers are those which are disclosed in the Stamatoff Patents U. S. 2,640,044 and 2,630,421.

The following examples illustrate further the preparation of hexamethylene diamine polyamide of 2,2-(carboxyphenyl)propane.

*Example 1.*—Molten hexamethylene diamine was transferred under nitrogen by means of a pipette into a heavy-walled Pyrex tube which had been evacuated and flushed with nitrogen several times. An equivalent quantity of 2,2-bis-(p-carboxyphenyl)propane (weighed to 0.1 mg., or five significant figures) was added. The resulting mixture, blanketed with nitrogen was evacuated to about 1 mm. pressure, and sealed. The sealed tube was heated at autogenous pressure under the conditions of time and temperature described in Table I. After cooling in air to room temperature the sealed tube was cooled in Dry Ice and opened. The clear, brittle low molecular weight polymer was powdered, transferred to a side armed tube, and heated at 218° C. while a slow stream of nitrogen was passed through the tube at atmospheric pressure. The viscosity of the polymer increased rapidly during the first 30 minutes of heating while water distilled out of the tube. After two hours the tube was further heated as shown in Table I. Finally, the tube was evacuated to about two mm. and heated for 2.0 hours at 259° C. Considerable frothing occurred at this stage and the polymer puffed up to a spongy mass. After cooling in air to room temperature while blanketed with nitrogen, the polymer was isolated by cracking away the glass tube.

Products virtually identical, in physical properties, with the product obtained in this example were prepared by using, in place of pure 2,2-bis-(p-carboxyphenyl)propane, mixtures of this compound and the meta-carboxyphenyl isomers thereof (m, m', and m, p). When the percentage of meta substitution was 10% (calculated as m, m', on the basis of the total 2,2-(carboxyphenyl)propane as 100), and also when it was 20%, no significant property changes were observed. When the percentage of meta substitution reached 30%, and higher, the stiffness/temperature characteristics became slightly inferior to those observed in the product from the pure bis(p-carboxyphenyl) isomer. However, even when the isomer used was pure bis(m-car- TABLE I—PREPARATION OF POLYAMIDE FROM HEXAMETHYLENE DIAMINE AND 2,2-BIS-(P-CARBOXYPHENYL)PROPANE

| Run No. | Pressure Cycle | | Atmospheric Pressure Cycle | | Vacuum Cycle | | Inherent Viscosity (0.5% solution in cresol) | Percent Insoluble in m-cresol at 135° C. |
|---|---|---|---|---|---|---|---|---|
| | Temp., ° C. | Time, hrs. | Temp., ° C. | Time, hrs. | Temp., ° C. | Time, hrs. | | |
| 1 | 245 | 3.5 | 218 | 2.0 | 218 | 2.0 | 1.09 | 23 |
| 2 | 230 | 3.25 | 218 | 2.0 | 218<br>259 | 2.0<br>2.0 | 1.54 | 64 |
| 3 | 230 | 3.0 | 218 | 2.0 | 218<br>254 | 2.0<br>2.0 | 1.31 | 51 |
| 4 | 220<br>230 | 2.5<br>1.0 | 218 | 2.0 | 218<br>259 | 2.0<br>2.0 | 0.9 | 0 |
| 5 | 225 | 4.0 | 218 | 2.0 | 218<br>259 | 2.0<br>2.0 | 1.49 | 0 | boxyphenyl) isomer, the stiffness/temperature characteristics were such that the temperature at which the resin was useful in usual plastics application was as high as 100° to 125° C. The pure bis(p-carboxyphenyl) polymer was suitably useable at temperatures up to about 140 to 150°. In the range of 100° to 125° C. the pure meta isomer was slightly inferior to the pure para isomer, but was nevertheless superior in retention of stiffening to hexamethylene polyadipamide.

*Example 2*—A mixture consisting of 4.0751 grams of hexamethylenediamine, 9.9432 grams 2,2-bis(p-carboxyphenyl)propane and 1.4044 grams (2 mol percent) beta-naphthoic acid was placed in a reaction tube which was evacuated and then sealed. This tube was heated for three hours at 250 C. under autogenous (superatmospheric) pressure. The resulting mixture was thereupon heated at atmospheric pressure under a blanket of nitrogen for 1 hour at 219° C., ½ hour at 259° C. and 1 hour at 282° C. There was no final vacuum heating step to drive the polymerization further than the stage of polymerization reached in the atmospheric pressure heating. The resulting product was pressed into excellent clear colorless films having an inherent viscosity of 1.01 (measured in a 0.5% by weight solution in m-cresol). This product had a yield point of 10,000 lbs./sq. in. (break point, A. S. T. M., D638–52T, 8,570 lb./sq. in.) with an elongation at break of 12%; Tukon hardness (kg. mm.$^2$)— long, 15.0—short, 19.6—with 23.3% recovery; and a dynamic modulus of 55% at 145 C., 75% at 125° C., and 82% at 70° C.

*Example 3*—A mixture consisting of .9317 gram of hexamethylenediamine, 2.6023 grams of dimethyl ester of 2,2-bis-(p-carboxyphenyl)propane was blanketed with nitrogen in a closed vessel at 130° C. for two hours followed by heating at 153° C. for two hours, 190° C. for two hours and 255 C. for five hours. Finally, the pressure on the polymerization mixture was lowered and the resulting product was heated in vacuo for four hours at 255° C. A clear, virtually colorless polymer, of relatively lower molecular weight than the polymer obtained in Examples 1 and 2 was thus prepared. Upon further heating during molding this product was convertible to a higher molecular weight polymer, similar to that of Examples 1 and 2.

*Example 4*—A mixture of precisely equimolal quantities of hexamethylene diamine and 2,2-bis(p-carboxyphenyl)propane was dissolved in ethanol (2B grade) at 70° C., whereupon the hexamethylene diamine salt of 2,2-bis-(p-carboxyphenyl)propane precipitated out. This was removed by filtration, washed with ethanol, and dried in a vacuum oven at 110° C. Portions of the dried salt were charged into an autoclave, with the quantities of acetic acid, as chain length regulator, listed below. This mixture was blanketed with nitrogen, sealed and heated to 260° C. for two hours, while bleeding off a little nitrogen to hold the pressure down to 300 lbs./per sq. in. The pressure was thereupon lowered to atmospheric pressure and heating was continued, bringing the temperature to 280° C. At this temperature the mixture was heated while applying a vacuum pump (5 mm. pressure) for two hours. The mixture was permitted to cool down to room temperature, under nitrogen at atmospheric pressure. The effect of adding the various amounts of acetic acid is shown in the following table.

TABLE II.—EFFECT OF VARIOUS PERCENTAGES OF CHAIN LENGTH REGULATOR ON INHERENT VISCOSITY OF END-CAPPED POLYAMIDE FROM HEXAMETHYLENE DIAMINE AND 2,2-BIS-(P-CARBOXYPHENYL)-PROPANE

| Mol Percentage of Acetic Acid Added (Based on Diacid Content) | Inherent Viscosity of Resulting Polymer | Molecular Weight of Resulting Polymer as Measured by Analysis for Amino and Carboxyl End Groups |
|---|---|---|
| 0 | 1.42 | 20,400 |
| 1 | 1.16 | 14,100 |
| 2 | 0.81 | 9,600 |
| 4 | 0.51 | 5,500 |

It is to be understood that while the foregoing examples are illustrative of the best methods of performing the invention, the invention is not limited thereto. The temperatures and reaction times employed in the various cycles for example are not inflexible and may be varied somewhat.

The physical properties of the product are quite extraordinary, or indeed unique. The polymers can be obtained in clear colorless form. In general, they are characterized by exceptional toughness and strength. A comparison between the polymers of this invention and previously known polyamides of outstanding properties is shown in the following table (Table III).

TABLE III.—PHYSICAL PROPERTIES OF HEXAMETHYLENE DIAMINE POLYAMIDE OF 2,2-BIS-(CARBOXYPHENYL)PROPANE, AS COMPARED WITH OTHER NYLONS

| Property | Hexamethylene Polyamide of 2,2-bis-(p-carboxyphenyl)-propane | Hexamethylene Polyadipamide | 2-Methylhexamethylene Polyadipamide | Polyoxamide from 2,11-Diaminododecane |
|---|---|---|---|---|
| Tensile Strength, p. s. i. | 11,600 | 9,800 | 11,200 | 10,500 |
| After 200 hours accelerated weathering | 8,760 | 7,110 | | |
| Elongation, percent | 11 | 250–300 | 3.4 to 9.9 | 12 |
| After 200 hours accelerated weathering | 9 | 115 | | |
| Flexural Modulus at −55° C., p. s. i. | 291,000 | 367,000 | | |
| at 23° C., p. s. i. | 352,000 | 165,000 | 385,000 | 328,000 |
| Room temperature stiffness retained at 143° C., percent | 80 | 10 | 8 | 15 |
| Creep mil./in./hr. at 3,000 p. s. i. | 3.5×10$^{-3}$ | 2.2×10$^{-2}$ | | 3.8×10$^{-2}$ |
| Hardness, Rockwell—M Scale | 76 | 80 | 87 | 83 |
| After 200 hours accelerated weathering | 86 | 30 | | |
| Izod impact at −40° C., ft./lbs./in. | 0.847 | 0.4 | 0.833 | 0.4 |
| at 23° C., ft. lbs./in. | 2.76 | 0.85 | 0.77 | 0.54 |
| at 100° C., ft. lbs./in. | 1.54 | | | |
| Linear thermal coef. of expansion, in./in./° C. | 6.64×10$^{-5}$ | 5.5×10$^{-5}$ | | |
| Heat distortion temperature at 264 p. s. i., ° C. | 140 | 60 | 100 | 88 |
| Deformation under load at 50° C., 2,000 p. s. i., percent | 0.5 | 1.4 | 0.24–0.86 | 0.41 |
| Fatigue endurance limit at 25° C., dry sample, p. s. i. | 6,000 | 5,000 | 3,500 | 2,500 |
| conditioned to 50% RH, p. s. i. | 4,000 | 3,000 | | |
| Coefficient of friction (static) | 0.245 | | | |
| Thermal conductivity, B. t. u./hr./ft.$^2$/f.°/in. | 1.24 | 1.7 | | |
| Mechanical phase angle | 0–1.0 | 5.0 | | |
| Work recovery in flexural hysteresis at 12,600 p. s. i., percent | 95 | 57 | | |
| Energy absorption, in. lb./in.$^2$/cycle | 0.05 | 0.14 | | |
| Density, g./cc. | 1.125 | 1.14 | 1.14 | 1.06 |
| Water absorption at 24 hours, percent | 3.34 | 6.15 | | |
| at equilibrium, percent | 4.66 | 7.05 | 1.95 | 0.96 |
| Dimensional change, percent | 0.85 | 1.34 | | |
| Dissipation Factor | 0.025 | 0.02 | | |
| Dielectric constant | 4.78 | 4.0 | | |
| Volume resistivity | 2.3×10$^{12}$ | 4.5×10$^{13}$ | | |

It is apparent from the foregoing comparisons that the polyamide from hexamethylene diamine and 2,2-bis(p-carboxyphenyl)propane has a surprising combination of properties. As hereinabove indicated, fibers of this polymer are, ordinarily, not appreciably oriented upon being stretched as much as 100% (although orientation does occur at 280% stretching), and the exceptional physical properties are therefore not a result of orientation. One of the most significant advances embodied in the present invention concerns the improvement in retention of stiffness with increase in temperature up to the softening point. At 143° over 80% of the room temperature stiffness is still retained. This is in marked contrast with hexamethylene polyadipamide, and the polyoxamides; both of the latter types of polyamides retain only 10 to 15% of their room temperature stiffness at 143°. Although the curve showing the variation of flexural modulus (stiffness) of hexamethylene poly(2,2-bis-p-carboxyphenylpropane)amide with temperature is flat up to 143° C., the stiffness falls off very rapidly above 160° C. This is highly desirable, and it makes possible the use of these novel polyamides in high temperature mechanical applications which are barred to other polymers which tend to lose stiffness and deform under load at temperatures well below their softening points.

The novel polyamides of this invention are useful in compression molding, extrusion, and injection molding applications, as well as in sheeting, solid foams, etc. They can be employed effectively with various fillers and reinforcing agents, such as glass, colloidal silica and/or carbon black. Because these polymers are obtainable in crystal clear solid form, they can be used effectively in combination with various dyestuffs and pigments, etc., and used in windows, electrical insulators, kitchenware handles, decorative furniture, lenses, reflectors, etc.; also for such applications as spray-coating, adhesive bonding, etc.

I claim:

1. A tough, amorphous polycarbonamide of hexamethylene diamine with a member of the class consisting of 2,2-bis-(p-carboxyphenyl)propane and 2,2-bis(m-carboxyphenyl)propane, having alternating units of the structure

and

respectively along the main polymer chain, said polycarbonamide being further characterized in that it fails to crystallize upon being heated for 300 hours in air at 150° C.

2. A composition according to claim 1 having an inherent viscosity within the range of 0.9 to 1.7, as measured in a 0.5%, by weight, solution in m-cresol.

3. Polyhexamethylene [2,2-bis-(p-carboxyphenyl)propane] amide.

4. A process for preparing clear colorless tough amorphous polycarbonamide of 2,2-bis-(p-carboxyphenyl)propane and hexamethylene diamine which comprises heating a composition composed of 2,2-bis-(p-carboxyphenyl)propane and hexamethylene diamine in substantially equimolal quantities, and from 0.5 to 4 percent, based on the weight of said 2,2-bis-(p-carboxyphenyl)propane, of an organic monocarboxylic acid, at a temperature in the range of 200° to 300° C., and continuing the heating until a polyamide having an inherent viscosity of 0.9 to 1.7, as measured in a 0.5%, by weight, solution in m-cresol, is obtained.

5. Process of claim 4 wherein the said acid is an aromatic acid.

6. Process of claim 4 wherein the said acid is a naphthenic acid.

7. Process of claim 4 wherein said acid is an alkanoic acid.

8. Process of claim 4 wherein the said composition composed of 2,2-bis-(p-carboxyphenyl)propane and hexamethylene diamine is hexamethylene diamine salt of 2,2-bis-(p-carboxyphenyl)propane, and the monocarboxylic acid is an alkanoic acid.

9. A polyamide of hexamethylene diamine and dicarboxylic acid components consisting of 2,2-bis-(p-carboxyphenyl)propane and at least one of its 2,2-(m-carboxyphenyl)propane isomers, the content of m-carboxyphenyl component, calculated as 2,2-bis-(m-carboxyphenyl)propane, being not more than 30% of the total weight of the 2,2-(carboxyphenyl)propane.

10. The polyamide of claim 9, with chains terminated by reaction with an organic carboxylic acid.

11. Composition of claim 10 in which the said acid is acetic acid.

References Cited in the file of this patent

UNITED STATES PATENTS

| | | |
|---|---|---|
| 2,174,527 | Peterson | Oct. 3, 1939 |
| 2,284,896 | Hanford et al. | June 2, 1942 |
| 2,389,628 | Martin | Nov. 27, 1945 |

UNITED STATES PATENT OFFICE
CERTIFICATE OF CORRECTION

Patent No. 2,836,579                                              May 27, 1958

Carl E. Schweitzer

It is hereby certified that error appears in the printed specification of the above numbered patent requiring correction and that the said Letters Patent should read as corrected below.

Column 3, line 7, for "160 grams" read -- 10 grams --; column 7, lines 15, 29, and 36, insert the symbol "°" after "250, 145, and 255", respectively.

Signed and sealed this 22nd day of July 1958.

(SEAL)
Attest:
KARL H. AXLINE                                              ROBERT C. WATSON
Attesting Officer                                           Commissioner of Patents